United States Patent
Denlinger

[15] 3,689,183
[45] Sept. 5, 1972

[54] AUTOMATED RETRACTABLE CONVEYOR

[72] Inventor: Carl E. Denlinger, Maumee, Ohio
[73] Assignee: Owens-Illinois, Inc.
[22] Filed: Feb. 19, 1971
[21] Appl. No.: 116,887

[52] U.S. Cl.................425/217, 264/37, 264/DIG. 37
[51] Int. Cl.................................................B29c 29/00
[58] Field of Search.....................425/135–138, 112; 425/151, 154, 215–217, DIG. 46; 264/DIG. 69, 37

[56] References Cited

UNITED STATES PATENTS

| | | | |
|---|---|---|---|
| 2,759,221 | 8/1956 | Edwards | 425/136 X |
| 2,923,976 | 2/1960 | Strauss | 425/216 X |
| 2,995,775 | 8/1961 | Schnitzius et al. | 264/DIG. 69 |
| 3,017,662 | 1/1962 | Marsh | 425/136 X |
| 3,277,522 | 10/1966 | Strauss | 425/215 |
| 3,407,444 | 10/1968 | Rees | 264/37 X |
| 3,418,694 | 12/1968 | Strauss | 264/37 X |

Primary Examiner—J. Spencer Overholser
Assistant Examiner—Michael O. Sutton
Attorney—Philip M. Rice and E. J. Holler

[57] ABSTRACT

Apparatus for molding objects from heat-softenable material which may include a plurality of molds, means for continuously supplying heat-softened material for the molds, and means for distributing heat-softened material from the supplying means to each of the plurality of molds. The heat-softened material supplied is removed for recovery, when the distribution of the heat-softened material is interrupted, by extendable-retractable means normally retracted to prevent interference with the distribution of the heat-softened material to the molds. The distributing means is positioned in a predetermined disposition with respect to the supplying means before the extendable-retractable means is extended to receive and recover heat-softened material. Removal and recovery of the heat-softened material may be initiated in response to the coincidence of an interruption of distribution of the heat-softened material and to the location of the distributing means in the predetermined disposition with respect to the supplying means.

19 Claims, 5 Drawing Figures

INVENTOR.
CARL E. DENLINGER
BY Philip M. Rice
& E. J. Holler
ATTORNEY

FIG. 2

INVENTOR.
CARL E. DENLINGER

FIG. 5

AUTOMATED RETRACTABLE CONVEYOR

BACKGROUND OF THE INVENTION

While the invention will be described specifically with respect to the manufacture of plastic containers and more specifically to a machine designed to mold plastic bottles, it will become apparent from the description that the invention is applicable to other manufacturing processes for molded articles.

The machine chosen for illustrating a specific embodiment of the invention herein pertains to the known type wherein a number of molds are conveyed continuously past an extruder producing a tubular blank or parison of plastic material. Each mold is closed in succession on a parison section and the latter is subjected within the mold to an expansion by internal blowing so as to take the exact shape of the mold impression which corresponds to that of the desired bottle or container. Subsequent to the shaping step and after a sufficient cooling time the mold is opened to permit the stripping and release of the shaped bottle, and the same cycle is resumed with a fresh mold.

In the past extruder has continuously produced the tubular blank or parison so that when bottles were not being molded due to machine difficulties, adjustments, minor repairs, etc. the tube fell through the mold wheel and became entangled with cooling lines, molds, blowing jacks, etc. The tube accumulated below the machine and became contaminated and overheated. Purgings were completely unusable for regrinding.

Accordingly, it is an object of this invention to provide novel apparatus for molding objects from heat-softened material which permits a thermoplastic supplying means to be operated continuously, when the means for distributing the thermoplastic material to the molds is inoperative or the operation thereof has been interrupted, while preventing the continuous supply of thermoplastic material from fouling the machine and enabling the supply of thermoplastic material to be recovered for recycling and reuse.

It is a further object of this invention to provide apparatus of the type disclosed herein wherein an interruption in the distribution of thermoplastic material to a plurality of molds enables the automatic recovery of the continuous supply of thermoplastic material for reuse and recycling to not only prevent fouling of the equipment but to also reduce the solid waste accumulation.

A still further object of this invention is to provide improved apparatus for the removal and recovery of thermoplastic material, which apparatus may be attached to existing machines already in operation.

A yet further object of this invention is to provide improved apparatus for molding objects of thermoplastic material.

SUMMARY OF THE INVENTION

The above objects of the invention have been illustrated herein in a preferred embodiment of apparatus for molding objects of thermoplastic material which includes a frame structure, a support rotatable mounted on the frame structure for rotation about an axis and carrying a plurality of molds disposed at spaced angular intervals on the support about the axis of rotation. A motor and pulley arrangement rotatably drives the support. The rotatable support thus acts as a distributing means by conveying the molds past an extruder. The extruder supplies heat-softened thermoplastic material to each of the molds at a distributing station located above the axis of rotation.

An extendable-retractable conveyor means is provided which has an inner portion or run extending transversely to the axis of rotation and supported in a cantilevered position adjacent the distributing station. Means are provided for extending the inner portion of the conveyor means to the distributing station to receive and remove thermoplastic material from the supplying means when the rotation of the mold support is stopped, and for retracting the conveyor means to enable distribution of the thermoplastic material to be resumed.

Other objects, advantages and features of this invention will become apparent when the following description is taken in conjunction with the accompanying drawings in which.

DESCRIPTION OF THE PREFERRED EMBODIMENT

Figure 1:
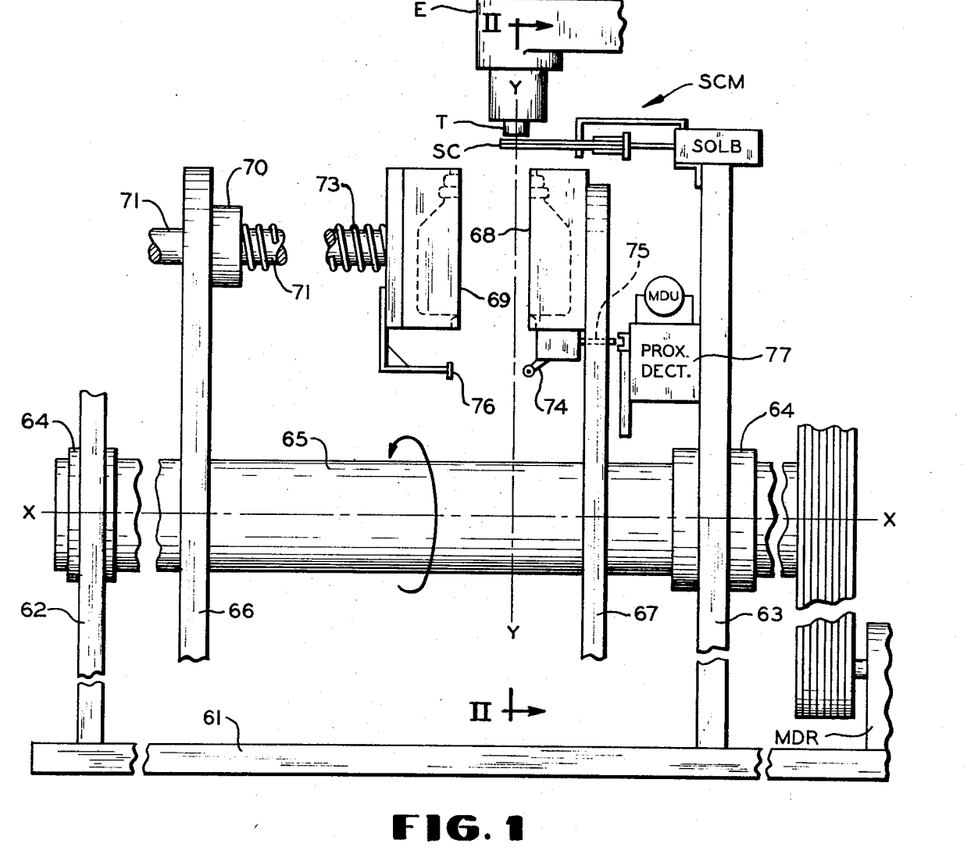
FIG. 1 is a diagrammatic elevational view showing a typical form of embodiment of apparatus constructed according to the teachings of this invention, a portion of the invention structure being omitted from this view for the purpose of clarity.
Figure 2:
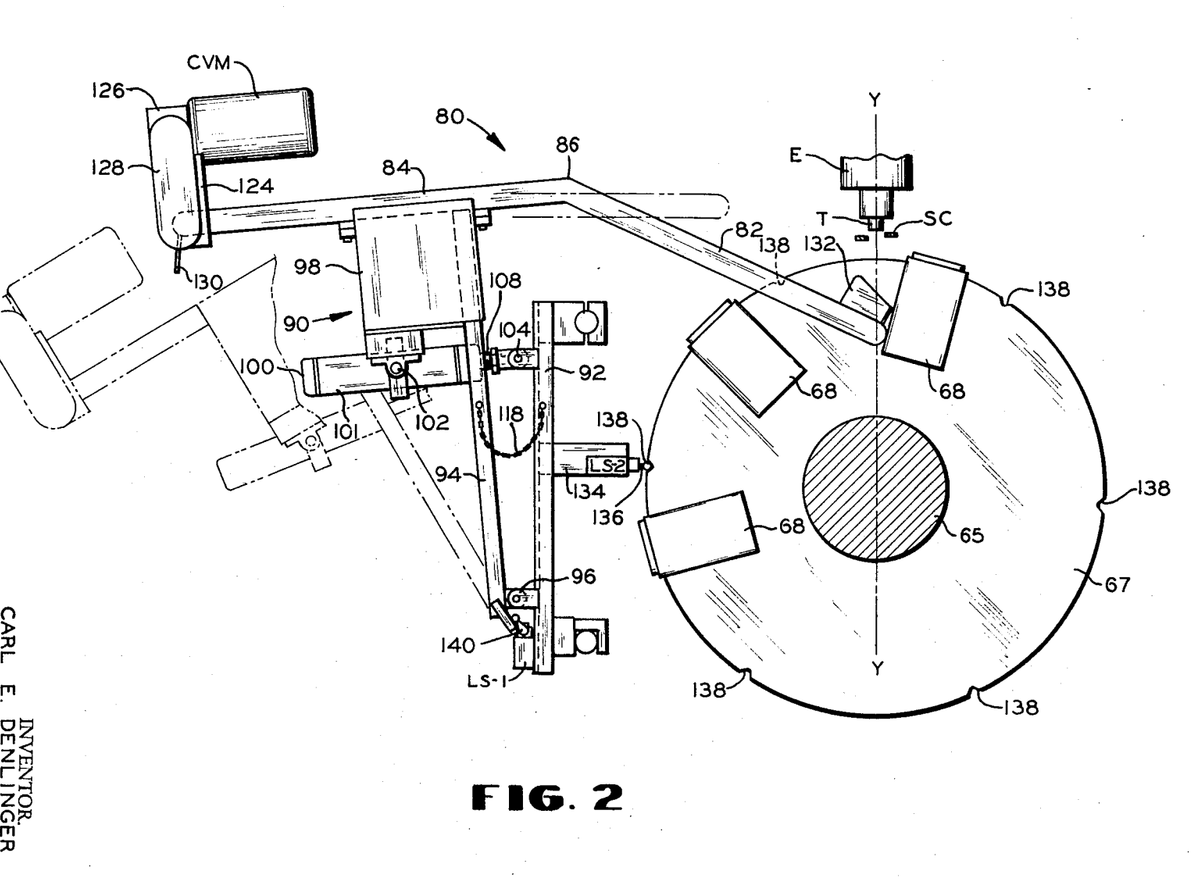
FIG. 2 is an end view taken from the left in section along lines II—II of FIG. 1, illustrating one form of a retractable conveyor which may be utilized in this invention.
Figure 3:
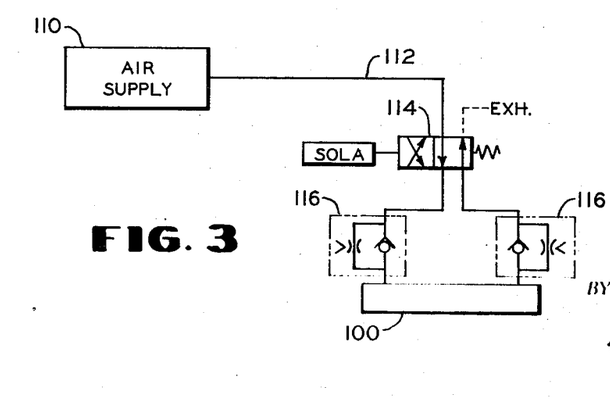
FIG. 3 is a schematic diagram of the pneumatic circuit which may be utilized to drive a fluid cylinder to extend and retract the conveyor illustrated in FIG. 2.

Referring to FIGS. 1, 2, and 3 of the drawings a machine according to the embodiment disclosed herein comprises a frame structure consisting essentially of a base plate or bed 61 and a pair of parallel vertical side flanges 62, 63. These flanges carry bearings 64 in which a main shaft 65 is journalled for rotation about the axis XX. The shaft 65 may be normally driven in the direction of the arrow in FIG. 1 by a motor and variator unit MDR through adequate belt and pulley transmission means.

The extruder unit E, shown only in very diagrammatic form in the drawings, is ordinarily carried by the frame structure. The extrusion head is disposed according to a vertical axis YY intersecting the axis XX of shaft 65 and therefore extends radially thereto. The extruder E produces a tubular blank or parison T, for example of rigid polyvinyl chloride.

The machine also includes a rotary mold support, the molding impressions or cavities of the molds having a shape and the dimensions of bottles or containers to be manufactured. This support may assume substantially the shape of a rotary drum.

The rotary mold support mounted on the shaft 65 consists of a pair of parallel vertical circular plates 66, 67 rigidly mounted on shaft 65 and carrying metal molds. In this example the support may carry six molds, but this number is not critical. The molds disposed at spaced angular intervals at the outer periphery of the plates each consist of two portions or mold halves, that is, a fixed half-mold 68 and a movable half-mold 69. Plate 67 carries the fixed half-mold 68 secured thereon (on the side of the extruder E). Plate 66 carries the movable half-mold 69, but so mounted thereon as to be movable in a direction parallel to the shaft axis XX. To this end the plate 66 carries on its outer peripheral portion as many sockets 70 as there are molds in the machine. These sockets register with a fixed half-mold 68. Each socket 70 has slidably mounted therein a rod 71 carrying at one end the corresponding movable half-mold 69 and at the opposite end suitable means for opening and closing the molds. The mold opening and closing mechanism is not illustrated since mechanisms suitable for use here are available and known to those skilled in the prior art and form no part of this invention. Each movable half-mold 69 is resiliently urged to its closed position, that is, in engagement with the corresponding fixed half-mold 68, by a return coil spring 73 surrounding the rod 71 and reacting between the movable half-mold 69 and the socket 70, as shown.

In one type of mechanical distribution cycle of the thermoplastic material from the extruder E to the molds 68, 69 the rotation of the mold supporting drum causes a cam engagement to open the molds. As the molds approach the distributing station beneath the extruder E the cam engagement is released in a manner whereby the molds may be reclosed first gradually and then rapidly until the molds are fully closed. In specific configurations of the cam engagement portion of the apparatus the molds may be closed rather abruptly whereby a movable mold half 69 is actually clapped against the corresponding fixed mold-half 68 around an extruded tubular parison T. A scissors mechanism SCM may include scissor elements SC which are actuated by a solenoid SOLB to sever the tubular parison after the mold halves have closed.

It is desirable to prevent a rebound action between the mold halves which may result from the abrupt closure of the mold halves. A number of mechanisms have been illustrated in the prior art to prevent such rebound and also to insure that the mold halves stay closed during that portion of the molding cycle when the parison section is subjected within the mold to an expansion by an internal blowing.

To detect a full closure, a rebound from the closure, and full closure during the internal blowing, means have been shown in FIG. 1 for sensing the relative position of the mold halves 68, 69 during critical portions of the molding cycle. A cam follower 74 pivotally carried by the fixed mold-half 68 is disposed to urge a plunger 75 to the right in response to contact with a cam surface 76 carried by the movable mold-half 69. In response to a proper closure plunger 75 is moved through plate 67 a sufficient distance to the right so that an arcuately shaped pickup track 78 of a proximity detector 77 will detect the rightwardly urged position of the plunger 75 and provide a signal to a malfunction detection relay MDU. The energization of relay MDU will close contacts MDU in the electrical control circuit of this invention to indicate that the mold halves are properly closed.

The pickup track 78 may be arcuately shaped and extended around the shaft 65 to follow the circular path of the plunger to be able to detect the position of a plunger 75 for slightly more than one-sixth of the circular path described by plunger heads of the plurality of molds. Thus, if the end of the pickup track is positioned at the initial mold closure point at the top of the circle of rotation, one of the plunger heads should be extended to the right to note a proper mold closure. The plunger head 75 should stay to the right to indicate that there has been no mold rebound. This energizes the relay MDU and its back contacts MDU in the electrical control circuit are opened.

Since there are six equally spaced molds in this embodiment the extension of the arcuate pickup head or track for one-sixth of the circular path of the plunger heads will enable, if the molds are closing correctly and staying closed, the continuous energization of the relay MDU. That is, at least one of the six sensing plungers will always be in the detection range of the arcuate pickup head. Thus the MDU back contacts in the electrical control circuit will stay open continuously indicating that there is no malfunction in the closing of the mold halves. The maintaining of the molds in a closed position during the internal blowing of the parison to form the container may be similarly detected.

The foregoing is a schematic representation of means for detecting a malfunction in the operation of the apparatus which would require the interruption of the distribution cycle of the circular plates 66, 67 in providing thermoplastic material for each of the molds. This malfunction sensing is intended to be representative of the sensing of malfunctions other than mold closure, rebound, mold locking during internal blowing, etc., for example, faulty scissor mechanism operation, release of the cooled containers, etc. In brief it is desired to detect and provide a signal for malfunctions requiring the interruption of the distribution cycle for machine adjustment, maintenance, repairs, or other reasons to stop the rotation of the distribution plates 66, 67. This signal may be used to automatically initiate the recovery operation as will be described hereinafter.

Whenever the distribution cycle of this and other machines for molding objects from continuously supplied thermoplastic material is interrupted, the supply of thermoplastic material continues to issue to entangle with the machine parts and accumulates below, becoming contaminated and overheated preventing reuse or recycling and becomes solid waste to be disposed of.

To enable removal and recovery of the continuously supplied thermoplastic material a conveyor generally indicated at 80 having a first or inner conveyor portion 82 and a second or outer conveyor portion 84 is supported to the left distribution station of the apparatus as illustrated in FIG. 2. The inner portion 82 is cantilevered and angled at 86 with respect to outer portion 84 to permit the insertion or extending of the inner portion 82 between fixed mold-halves 68 when the mold-halves 68 are properly positioned with respect to the distributing station beneath the extruder E.

The conveyor 80 may be an endless-belt chain-drive mechanism, driven by a conveyor motor CVM mounted on a support bracket 124 at the outer end of the outer portion 84. A gear box 126 and suitable belt-pulley or sprocket-chain assembly means 128 connects motor CVM to drive the endless belt.

The outer end of the outer portion 84 may be positioned above a processing and recovery unit PRU illustrated diagrammatically in FIG. 4 in the control circuit for regrinding the thermoplastic material for recycling and use later. A stainless steel scraper 130 is situated adjacent the endless belt at the outer end thereof to insure removal of thermoplastic material carried by the endless belt to the processing and recovery unit PRU. A stainless steel chute 132 may be advantageously placed on the inner end of the inner portion 82 to guide the tubular parison T onto the conveyor for removal to the processing recovery unit.

Means for supporting conveyor 80 is indicated generally at 90. A fixed standard 92 may be rigidly connected to the base plate and/or the side flanges of the frame structure. A movable standard 94 is pivotally connected to the fixed standard 92 by a pivot means 96 carried in flanges extending from each of the standards toward the other. A conveyor bed support 98 is secured to the upper end of the movable standard 94 and connected to and positioned beneath the outer portion 84 of the conveyor 80.

The conveyor 80 is extendable toward a thermoplastic receiving position at the distributing station and retractable to a position out of the way of the rotation of the fixed mold-halves 68 by means of a fluid cylinder motor 100. The fluid utilized in this embodiment is air. The fluid cylinder motor 100 has a cylinder body 101 which is pivotally connected at 102 to the movable standard 94, in a pivotally suspended position beneath the conveyor bed support 98. A piston rod 108 of the fluid cylinder motor 100 has its externally extending end pivotally connected at 104 to the fixed standard 92.

Referring to FIG. 3 it can be seen that an air supply 110 supplies air under pressure through conduit 112 and a solenoid operated valve 114 to the air cylinder motor 100. When the conveyor 80 is in the retracted position and it is desired to extend the chute 132 to a position beneath the distributing station, air pressure is supplied via valve 114 to the air cylinder motor 100 in response to the energization of the solenoid portion SOLA of the valve 114. Air pressure in the cylindrical body 101 pushes against the piston therein to move the motor 100, the pivotable standard 94, and the conveyor 80 to the right to the position shown in FIG. 2.

When it is desired to retract the conveyor 80 the solenoid SOLA is deenergized to disconnect the air pressure supply 110 from the cylindrical body 101 and to connect the body 101 to an exhaust port. Because the conveyor assembly is designed to provide more weight to the left of the assembly than to the right of the assembly, the force of gravity will pull the conveyor toward a retracted position and cause the air to be expelled from the cylinder 101 through the exhaust port of valve 114. Flow control valve means 116 may be interposed between both the pressure and the exhaust ports of the air cylinder motor 100 to permit a controlled pressurization and a controlled release of the air in the cylinder to control the extending and retracting speed.

A flexible chain or other suitable linkage 118 in secured between the fixed standard 92 and the movable standard 94 to restrict outward travel of the conveyor assembly 80 to support the weight of the mechanism to prevent the full weight from resting on the air cylinder assembly. This also insures that the air cylinder will be in the same position each time that the air cylinder motor is energized so that the time of inward travel will always be the same.

A limit switch LS1 may be mounted on the fixed standard 92 at the bottom end thereof and, via a cam follower arm 140, detect whether the conveyor is in the retracted or extended position and close LS1 contacts corresponding to the detected position in the control circuit to be described hereinafter.

A limit switch LS2 may be carried on a flange 134 extending from the standard 92, and via a cam follower arm 136, detect the angular disposition of the fixed half-molds 68 with respect to the axis YY of the distribution station to enable insertion of the inner end of the cantilevered conveyor means 80 without contact between the conveyor and the mold-halves 68. Detent notches, projections or other cam surfaces 138 may be spaced around the periphery of the support plate 67 to actuate LS2 contacts closed or opened to note conveyor insertion positions of plate 67.

ELECTRICAL CONTROL CIRCUIT DESCRIPTION

Figure 4:
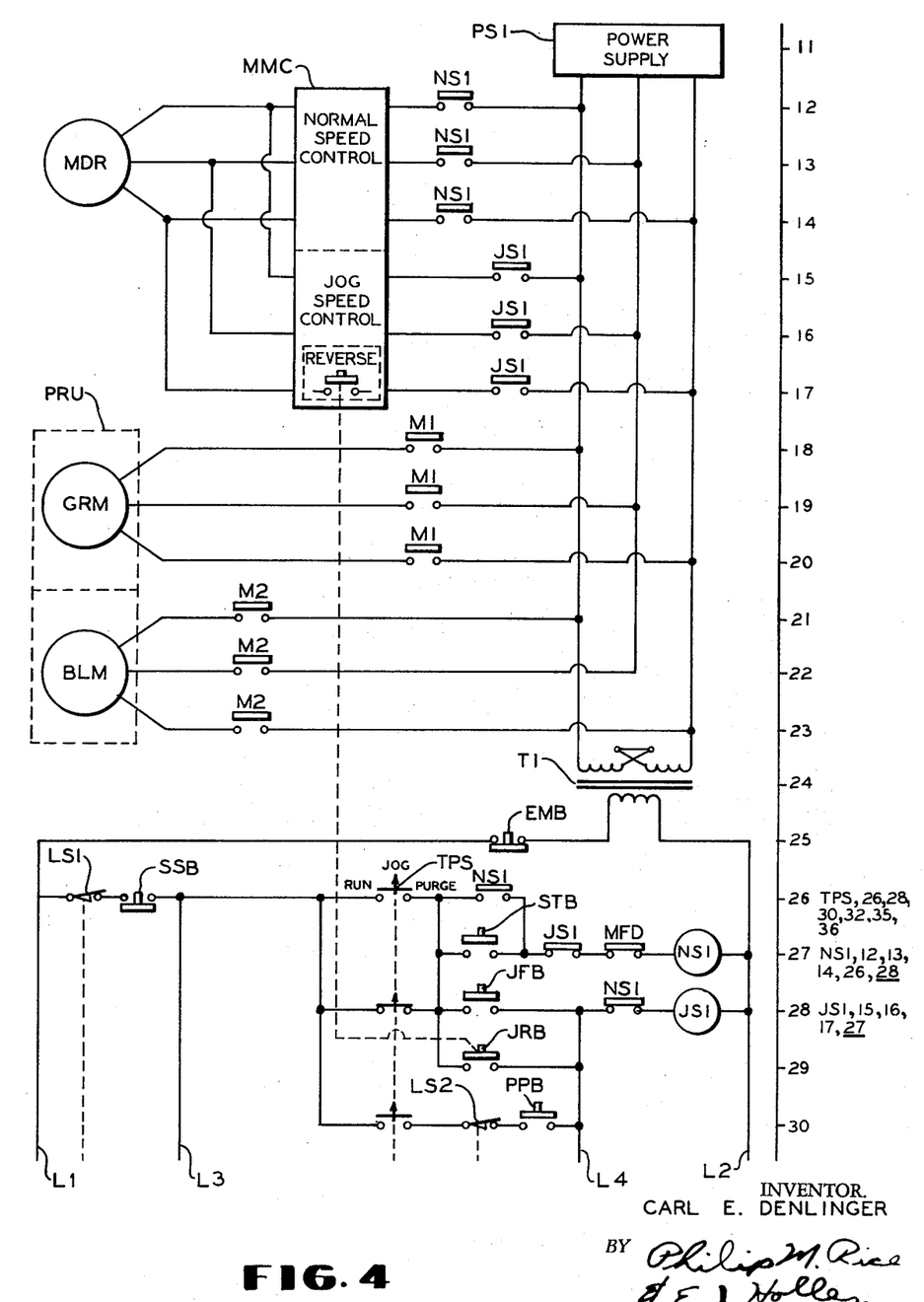
FIG. 4 is a schematic diagram of a first part of the electrical control circuit of the apparatus herein.
Figure 5:
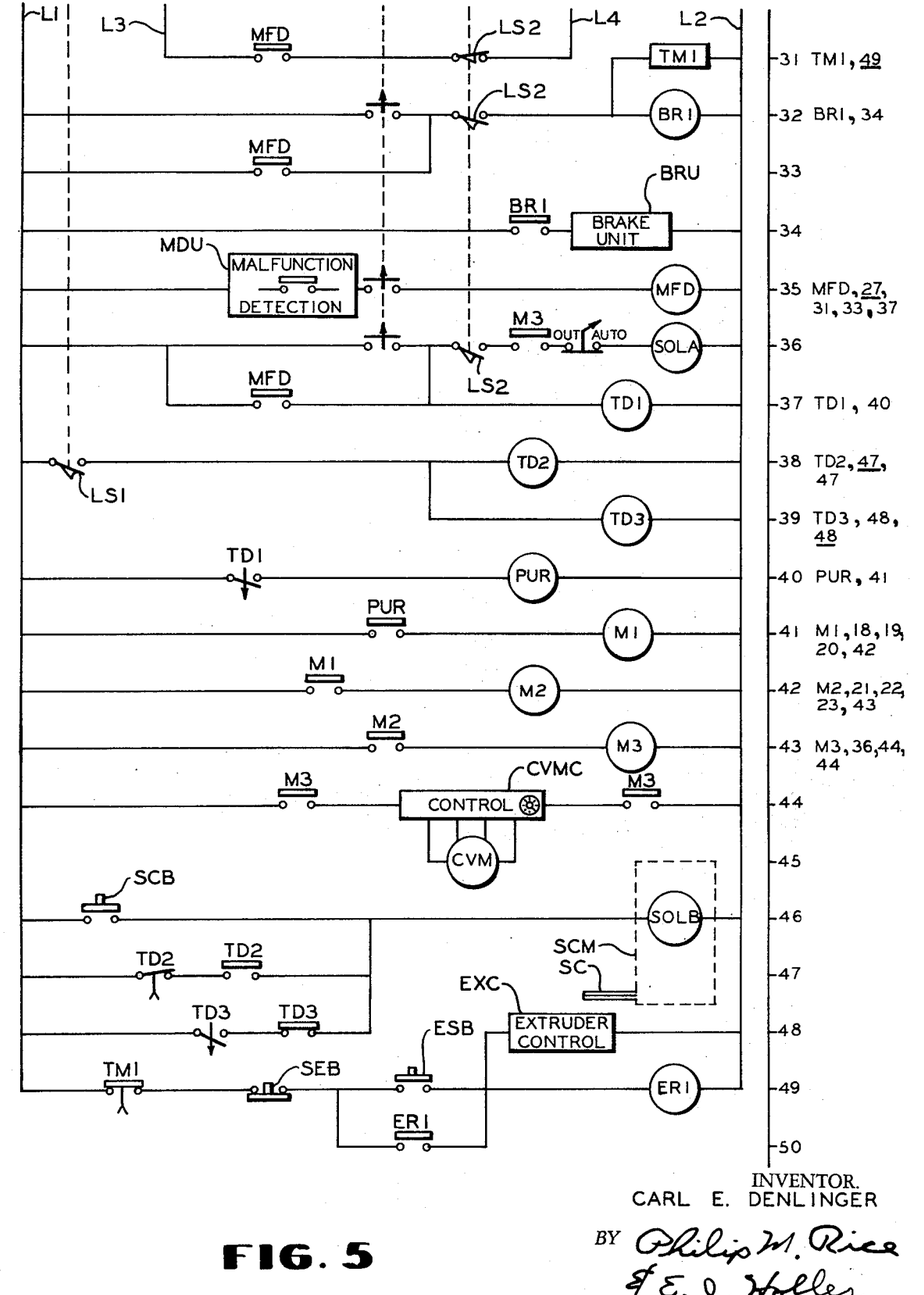
FIG. 5 is a schematic diagram of a second part of the electrical control circuit of this invention.

Referring to FIGS. 4 and 5 there is illustrated a circuit schematic for controlling the preferred embodiment of this invention.

It will be noted that the electrical circuit schematic has been laid out in line diagram form. A component can be readily located by reference to the line number where the component is positioned.

Further, contact switching operations may normally be noted without designating a mechanical tie between the contacts and the actuating means. The contacts may be located at any convenient position, even though quite remote from their actuating means. Cross reference between the actuating means and its associated contacts is easily accomplished by noting in the right hand margin of the drawings the reference character of the actuating means, for example relay JS1, adjacent line number 28, the line in which the actuating relay coil is located for energization. Following the reference character the line numbers in which the JS1 contacts appear are noted, i.e., 15, 16, 17, 27. A contact line number notation that is not underlined indicates that those contacts are normally open, as in lines 15, 16, 17. A contact line number notation that is underlined indicates that those contacts are normally closed, i.e., as in line 27. Other actuating means and their associated contacts are similarly noted.

It is also to be noted that only that part of the normal control circuitry of the molding machine utilized to illustrate the preferred embodiment of this invention is shown that is associated with the inventive concepts herein.

As noted hereinbefore in the description of the apparatus illustrated in FIG. 2, a limit switch mechanism LS1 is responsive to the position of the conveyor means 80, LS1 contacts in line 26 close when the conveyor is fully retracted. LS1 contacts in line 38 close when the conveyor 80 is extended to the distributing station to remove the thermoplastic material for recovery. Similarly, the limit switch mechanism LS2 is responsive to the distributing wheel or plate 67 position LS2 contacts in lines 30, 31 open when the distributing wheel is in a position enabling insertion of the conveyor between the molds. LS2 contacts in lines 32 and 36 close when the distribution wheel is in position enabling insertion of the conveyor between the molds.

In normal operation the three position switch TPS, which is actuatable in line 26, controls the apparatus of this invention. When the switch TPS is placed in the "RUN" position, TPS contacts in line 26 and 35 close while the rest of the TPS contacts remain open. When the start pushbutton STB in line 27 is closed the normal speed relay NS1 in line 27 is energized through closed LS1 contacts (since the conveyor 80 is retracted), secondary stop pushbutton contacts SSB, and TPS contacts in line 26, and through closed jog speed back contacts JS1 and closed malfunction detection back contacts MFB in line 27.

Front contacts NS1 in lines 12, 13 and 14 close when the normal speed relay NS1 is energized to connect the power supply PS1 in line 11 to the normal speed control portion of the main motor control MMC to start and run the main drive motor MDR in line 13 to place the machine in operation. Front contacts NS1 also close in line 26 to establish a holding circuit around the pushbutton STB to maintain energization of the normal speed control section of the main motor control MMC. Back contacts NS1 open in line 28 to disable the energizing circuit of the jog speed control relay JS1.

The extruder mechanism may be placed in operation by closing extruder start pushbutton ESB in line 49. This energizes extruder control EXC in line 48 to operate the extruder mechanism and energizes extruder relay ER1 in line 49 through closed stop extruder pushbutton SEB and closed timer back contacts TM1 in line 49. Contacts ER1 in line 50 close in response to the energization of extruder relay ER1 to establish a holding circuit around extruder start pushbutton ESB to maintain the extruder mechanism EXC in operation.

All mechanisms may be stopped be depressing the emergency stop pushbutton EMB in line 25 to remove the power supplied to the control circuit leads L1, L2 by transformer T1 in line 24 from the power supply PS1.

The power to control circuits for the drive motor MDR may be interrupted by depressing secondary stop button SSB in line 26. Also, as noted, unless the conveyor 80 is fully retracted out of the way of the operation of the molding machine then limit switch contacts LS1 in line 26 open to prevent operation of the drive motor MDR.

The operation of the extruder mechanism EXC may be stopped by depressing stop extruder pushbutton SEB in line 49 to deenergize extruder run relay ER1 to drop out contacts ER1 line 50 to disable the holding circuit around the pushbutton ESB in line 49.

If desired, a timing mechanism TM1 may be made responsive to the initiation of the extrusion removal and recovery operation, as by connecting the timing mechanism TM1 in line 31 to be energized at the same time as brake relay BR1 in line 32. The timing mechanism may record the total time of each removal and recovery operation. Further, the timing mechanism may be provided with back contacts TM1 which may be connected in line 49 to open after a predetermined period of energization of mechanism TM1 to deenergize the extruder mechanism control EXC in the same manner as the depression of pushbutton SEB.

In the "JOG" position of the three position switch TPS, the TPS contacts in line 28 close while the remainder of the TPS contacts remain opened. The closure of JOG forward pushbutton JFB in line 28 is thus able to energize the jog speed relay JS1 in line 28 through limit switch contacts LS1, SSB contacts, (both in line 26) TPS contacts, and normal speed back contacts NS1 (in line 28).

In response to the energization of the jog speed relay JS1 the jog speed back contacts JS1 open in line 27 to disable the energizing circuit for the normal speed relay NS1. Jog speed front contacts JS1 in lines 15, 16, and 17 close to connect the power supply PS1 to the jog speed control section of the main motor control circuit MMC to index or rotate the distributing wheel forward at a slower or reduced speed for maintenance work or adjustment purposes.

The closure of job reverse pushbutton JRB in line 29, which is connected in parallel with the jog forward pushbutton JFB, also energizes jog speed relay JS1. However, the jog reverse pushbutton JFB is linked with a circuit in the jog speed control portion of the main motor control MMC which reverses the power connections of the power supply to MDR thus enabling the distributor wheel to be indexed or rotated in the reverse direction.

In the "PURGE" position of the three position switch TPS the TPS contacts in line 30, 32 and 36 close while the remainder of the TPS contacts are open. The closure of TPS contacts in line 30 enables the energization of the jog speed relay JS1 in line 28 by closure of the purge pushbutton PPB in line 30. The energization of jog speed relay JS1 closes contacts as hereinbefore described to move the distribution wheel forward. When the distribution wheel or support plate 67 reaches a position wherein the angular disposition of molds 68 permits the insertion of the conveyor 80 to receive thermoplastic material from the extruder E, cam follower 136 of limit switch LS2 (as seen in FIG. 2) is actuated by a detent or cam surface 138 to indicate that the wheel is in the proper position. Thus, limit switch contacts LS2 in line 30 open to deenergize the jog speed relay JS1 and disconnect the driving motor MDR. Limit switch contacts LS2 in line 32 close to energize a brake relay BR1 through contacts TPS which are closed in the purge position of the three position switch. Limit switch contacts LS2 also close in line 36 to enable an energizing circuit for solenois SOLA to be ready to start the air cylinder motor 100 to move the conveyor means to the position shown in FIG. 2.

Energization of the brake relay BR1 in line 32 closes contacts BR1 in line 34 to energize a brake unit BRU to stop and hold the distribution wheel 67 in the position shown in FIG. 2. As noted hereinbefore a timing mechanism TM1 may also be energized at this time by closure of the limit switch contacts LS2 in line 32.

Closure of the TPS contacts in the purge position in line 36 energizes time delay relay TD1 in line 37. Time delay relay contacts TD1 in line 40 close immediately and will stay closed as long as relay TD1 is energized. When time delay relay TD1 is deenergized TD1 contacts in line 40 will drop out or open after a predetermined time delay interval to permit continued operation of the processing unit motors and the conveyor motor to insure removal of all thermoplastic material from the conveyor 80 and the processing thereof by the processing unit.

The closure of TD1 front contacts in line 40 energizes a purge relay PUR in the same line. Front contacts PUR close in line 41 to energize a grinder motor relay M1 in line 41. Front contacts M1 close in lines 18, 19, and 20 to connect the grinder motor GRM in line 19 of the grinder section of the processing unit PRU to the power supply PS1.

Grinder motor relay contacts M1 also close in line 42 to energize blower motor relay M2 in the same line. Blower motor relay contacts M2 close in lines 21, 22, and 23 to connect blower motor BLM in line 22 of the blower section of the processing unit PRU to the power supply PS1. Blower motor relay contacts M2 also close in line 43 to energize the conveyor motor run relay M3 in the same line. Conveyor motor relay contacts M3 then close in line 36 to complete the energization circuit to the solenoid SOLA of the air cylinder motor 100, already enabled by the closure of TPS contacts in the "PURGE" position and limit switch contacts LS2. Energization of solenoid SOLA opens valve 114 to cause the conveyor 80 to be driven to the thermoplastic receiving position shown in FIG. 2, as described hereinbefore.

Conveyor motor relay contacts in line 44 also close to supply power to the conveyor motor control circuit CVMC to drive conveyor motor CVM in line 45. The speed of the conveyor motor may be adjusted so that the endless belt of conveyor 80 moves at a rate matching the rate of extrusion of the parison from the extruder E.

It can thus be seen that the circuit herein provides for the sequential energization of the grinder motor first enabling the overcoming of the inertial forces in the grinder unit, secondly the blower motor in the processing unit, thirdly the conveyor drive motor CVM and finally the solenoid SOLA is energized to extend the conveyor 80 into the thermoplastic receiving position. If any one of the motors does not receive a proper starting signal then the remainder of the motors will not be started.

When the conveyor 80 has moved out of its retracted position the limit switch contacts LS1 in line 26 open. This disables all the circuits which may be utilized to energize either the jog speed relay JS1 in line 27 or the normal speed relay NS1 in line 28 and thus prevents the drive motor MDR from attempting to move the distributor support wheel 67 from the position shown in FIG. 2.

Since the air cylinder motor 100 has been activated by the energization of solenoid SOLA in 36 and the conveyor means 80 is being extended into the thermoplastic receiving position, limit switch contacts LS1 close in line 38 energizing time delay relay TD2 in the same line. Time delay relay front contacts TD2 in line 47 close immediately completing a circuit through time delay relay TD2 back contacts in the same line to energize solenoid SOLB in line 46 of the scissors mechanism SCM. After a small delay the time delay back contacts TD2 in line 47 open, so that the solenoid SOLB has received a short period of energizing current to sever the tubular parison to insure that a freshly severed end of the extruded parison will be guided by the chute 132 onto the conveyor 80. This enables parison to be conveyed by the conveyor to the processing unit PRU and prevents any possibility that the parison to be removed will be caught or entangled past the end of the conveyor or chute 132.

The closure of limit switch contacts LS1 in line 38 also energizes time delay relay TD3 in line 39. Back contacts TD3 open in line 38 while front delay contacts TD3 close, both immediately. The energizing circuit in line 48 for the scissors mechanism SCM thus remains open until limit switch LS1 contacts in line 38 open, indicating that the conveyor 80 is withdrawing. When the LS1 contacts in line 38 open the time delay relay TD3 is deenergized. Back contacts TD3 in line 48 close immediately, completing the energizing circuit in line 48 to the solenoid SOLB of the scissors mechanism to cause a severing of the parison. After a short interval the time delay back contacts TD3 open to deenergize the scissors mechanism. Thus a shot of energizing current has been delivered to the scissors mechanism SCM as the conveyor is withdrawing to enable a severing of the parison, and to permit a new parison to start to be extruded for the molding operations that are about to begin again.

When the semi-automatic purging operation is completed in response to the switch TPS being turned to the "PURGE" position, the three position switch TPS may be switched back to the "RUN" position. This closes the "RUN" contacts of the TPS switch in lines 26 and 35. However, since the conveyor is still at least partially in the extended position limit switch contacts LS1 are still open in line 26 and prevent the energization of the drive motor MDR. All of the other TPS contacts open including the TPS contact in line 36. This deenergizes the solenoid SOLA, closing the valve 114 in FIG. 3, and permits the withdrawal of the conveyor 80 to a retracted position.

The opening of TPS contacts in line 36 also deenergizes time delay relay TD1 in line 37. After a predetermined time interval the time delay relay contacts TD1 in line 40 open deenergizing the purge relay PUR in line 40. The predetermined delay for opening the contacts TD1 in line 40 permits the conveyor motor CVM to continue to run and the processing unit PRU to continue to operate (including the grinder and blower motors GRM, BLM, in lines 19, 22) until the thermoplastic material on the conveyor 80 has been removed and gone through the recovery process.

After the time delay relay TD1 has opened the contacts TD1 in line 40, the purge relay PUR is deenergized opening its contacts PUR in line 41 to deenergize the grinder motor relay M1 in the same line. The deenergization of relay M1 opens contacts M1 in line 42 to deenergize the blower motor relay M2 in the same line. Contacts M2 now open in line 43 to deenergize the conveyor motor relay M3 in the same line. Contacts M3 open in line 36 to disable the energizing circuit for the air cylinder motor 100. Contacts 43 also open in line 44 to deenergize the conveyor motor control CVMC. The manually initiated purging and the removing and recovering of the thermoplastic material being continuously supplied has now completed its cycle.

If the molding machine has been satisfactorily adjusted so that little operator attention is required, it is desirable to provide a means for automatically initiating and completing the cycle just described. In order to provide this operation a malfunction detector is connected in the control circuit, similar to that described in FIG. 1 for detecting the full closure of the molds, the lack of rebound on closing, the closure of the molds during the internal blowing process, or other malfunctions which should cause an interruption in the distribution cycle.

A malfunction detection unit MDU is connected in line 35 through TPS contacts which are closed in the "RUN" position to energize a malfunction detection relay MFD when internal contacts of the unit MDU close in response to the detection of a malfunction.

The energization of the malfunction detection relay MFD opens back contacts MFD in line 27 to deenergize the normal speed relay NS1 to disconnect the normal drive speed control portion of the main motor control MMC from the power supply PS1. Front contacts MFD in line 31 close to energize the jog speed relay JS1 in line 28, through closed limit switch contacts LS2 in line 31 and normal speed back contacts NS1 in line 28. This energizes the jog speed control portion of the main motor control as noted hereinbefore, and the rotation of the distributor wheel 67 continues at a reduced or slower rate until the limit switch LS2 reaches a cam surface or detent 138 to indicate that the wheel is in the proper position. Limit switch contacts LS2 then open in line 31 to deenergize the jog speed relay JS1 in line 28. Contacts LS2 close in line 32 to energize the brake relay BR1 in the same line through now closed MFD contacts in line 33. The brake unit BRU is then energized in the manner hereinbefore described, along with the timing unit TM1 in line 31.

Front contacts MFD are also closed in line 37 and the energizing circuits for the air cylinder motor solenoid SOLA and the time delay relay TD1 are not enabled, even though the three position switch TPS is in the "RUN" position or mode.

The operation of the control circuit and the mechanism is now the same from this point as the above described manually initiated operation. Since this is an automatic interruption of distribution of thermoplastic material to the plurality of molds and since the operator may be giving less personal attention to each unit, the use of the timer mechanism TM1 in line 31 and its back contacts in line 49 to deenergize the extruder E may be more helpful than when the machine is being manually purged. It might be some time before the operator can give attention to the problem that caused the closure of the malfunction back contacts in the malfunction detection unit MDU.

When the malfunction is corrected, the malfunction detection back contacts in the unit MDU open deenergizing the malfunction relay MFD in line 35. Back contacts MFD close in line 27 to enable the "RUN" circuit through the normal speed relay NS1. Front contacts MFD open in line 31 to disable the alternate energizing circuit for the jog speed relay JS1. Front contacts MFD open in line 33 to disable the energizing circuit for the brake relay BR1 and the timing mechanism TM1. Front contacts MFD in line 37 open disabling the energizing circuit for the solenoid SOLA and the time delay relay TD1. Thus the conveyor mechanism 80 automatically retracts and upon closure of the LS1 contacts in line 26 in response to full retraction, normal operation may again be initiated by pushing the start pushbutton STB in line 27.

There has thus been described and disclosed hereinbefore apparatus for molding objects of thermoplastic material which includes a frame structure, a distributing support rotatably mounted on the frame structure which carries a plurality of molds disposed at spaced angular intervals on the support. A motor is provided for rotatably driving the support. Extruder means are provided at a distributor station for supplying thermoplastic material to each of the molds as the support rotates to carry each mold to the distributing station in a distributing cycle.

Extendable-retractable means are provided for receiving and removing the thermoplastic material from the distributing station when the distribution of thermoplastic material to the mold is interrupted. A limit switch senses a predetermined angular position of the molds with respect to the distribution station to permit positioning of the extendable-retractable conveyor at the distribution station. An air cylinder motor responsive to the angular position sensing limit switch enables extending the conveyor to receive and remove the thermoplastic material.

Means are provided for automatically sensing a malfunction in the operation of the molding apparatus, and means responsive to the malfunction sensing means interrupts the distributing cycle of the support means and enables the initiation of an automatic cycle for extending the conveyor means to remove the thermoplastic material from the distributing station.

The turning of the three position switch TPS to the "PURGE" position and the operation of the malfunction detection unit each provide means for sensing an interruption in the distributing cycle of the support plate. Manual or automatic means have been shown which are responsive to the interruption sensing means for rotating the support to posption the mold at the predetermined angular position with respect to the distributing station to enable the insertion of the conveyor. A brake unit is responsive to the predetermined angular position sensing means to stop the rotation of the support plate after the support has reached a predetermined angular position and hold the support plate in that position.

The conveyor is extended to the distributing station in response to a coincidence in the occurrence of an interruption of the distributing cycle of the support plate and the positioning of the molds at the predetermined angular position with respect to the distributing station.

The thermoplastic supplying means comprises in the preferred embodiment an extruder which supplies a tubular parison of thermoplastic material. A scissors mechanism for severing the extruded parison is provided for use during the normal distribution cycle. The scissors mechanism is also responsive to the extending of the conveyor means to the distributing station for severing the extruded parison to permit recovery of the thermoplastic material without entanglement. Similarly, the scissors mechanism is also responsive to the retraction of the conveyor for severing the extruded parison to enable the normal molding processes to begin.

While the speed of some molding machines during the distributing cycle is slow enough to permit going directly from a distributing speed of the support plate 67 to a stop, in response to the detection of the predetermined angular position by the limit switch contacts LS2, a higher speed machine may make it desirable to provide a "jog" or reduced speed to permit the hunting for the predetermined angular position and the application of the brake when the position is reached. Thus, a manual jog speed control has been provided. Means have also been provided for automatically reducing a normally faster speed to a jog speed when a malfunction detector unit is utilized to automatically interrupt the distributing cycle of the machine.

It is to be noted that the malfunction detection unit has been specifically described in the preferred embodiment as being responsive to a malfunction in the operation of the molds. However, it is intended that the need for stopping the molding machine or process may be detected as a result of other malfunctions of the molding machine or in the process. For example, if the bottles are not separating properly from the molds, or if a malfunction occurs in equipment handling, trimming, or otherwise operating on the bottles coming from the molding machine, then the molding machine should be stopped until the malfunction is corrected. During the time the machine is stopped the process and apparatus described herein will be operable in response to the detection of one or more such malfunctions to remove and recover for reuse the heat-softened material continuing to emerge from a supplier of the material, as shown for the parison from the extruder unit.

In conclusion, it is pointed out that while the illustrated examples constitute practical embodiments of my invention, I do not limit myself to the exact details shown since modification of these details may be made without departing from the spirit and scope of this invention.

I claim:

1. Apparatus for molding objects from heat-softened material comprising
    a. a plurality of molds;
    b. means for continuously supplying heat-softened material for said molds;
    c. means for supporting said plurality of molds;
    d. means for receiving and removing for recovery heat-softened material supplied by said supplying means when the distribution of said heat-softened material is interrupted, including extendable-retractable means normally retracted to prevent interference with the operation of said supporting means;
    e. means for positioning said supporting means in predetermined disposition with respect to said supplying means to permit the extending of said extendable-retractable means to receive heat-softened material from said supplying means;
    f. means for extending said extendable-retractable means to receive heat-softened material from said supplying means; and
    g. means responsive to the location of said supporting means in said predetermined disposition and to the interruption of distribution of said heat-softened material to said plurality of molds for enabling operation of said extending means.

2. Apparatus as defined in claim 1 which further includes means responsive to the extending of said extendable-retractable means for preventing operation of said supporting means.

3. Apparatus as defined in claim 1 which further includes means responsive to the retracted position of said extendable-retractable means for enabling operation of said supporting means.

4. Apparatus for molding objects of thermoplastic material which comprises
    a. a frame structure,
    b. a support rotatably mounted on said frame structure for rotation about an axis,
    c. means for rotatably driving said support,
    d. a plurality of molds disposed at spaced angular intervals on said support about said axis of rotation,
    e. means at a distributing station for supplying thermoplastic material to each of said molds as said support rotates to carry each mold to said distributing station in a distributing cycle,
    f. extendable-retractable means for receiving and removing thermoplastic material from said distributing station when the distribution of thermoplastic material to said molds is interrupted,
    g. means for sensing a predetermined angular position of said molds with respect to said distribution station which will permit positioning of said extendable-retractable means at said distribution station; and
    h. means responsive to said angular position sensing means for enabling the extending of said extendable-retractable means to receive and remove thermoplastic material from said distributing station.

5. Apparatus as defined in claim 4 which further includes
    a. means for sensing a malfunction in the molding process of said molding apparatus, and
    b. means responsive to said malfunction sensing means for interrupting said distributing cycle of said support means.

6. Apparatus as defined in claim 4 which further includes
    a. means for sensing an interruption in the distributing cycle of said support means, and
    b. means responsive to said interruption sensing means for rotating said support to position said molds at said predetermined angular position with respect to said distributing station.

7. Apparatus as defined in claim 6 which further includes brake means responsive to said predetermined angular position sensing means for stopping the rotation of said support after said means responsive to said interruption sensing means has rotated said support to said predetermined angular position.

8. Apparatus as defined in claim 4 which further includes means for extending said extendable-retractable means to said distributing station in response to a coincidence in the occurrence of an interruption of the distributing cycle of said support means and the positioning of said molds at said predetermined angular position with respect to said distributing station.

9. Apparatus as defined in claim 4 in which said thermoplastic supplying means includes means for extruding a parison of said thermoplastic material, and in which said apparatus further includes means responsive to the extending of said extendable-retractable means to said distributing station for severing said extruded parison.

10. Apparatus as defined in claim 4 in which said thermoplastic supplying means includes means for extruding a parison of thermoplastic material, and in which said apparatus further includes means responsive to the retraction of said extendable-retractable means from said distributing station for severing said extruded parison.

11. Apparatus as defined in claim 4 which further includes
   a. means for sensing an interruption in said distributing cycle, and
   b. means responsive to said cycle interruption sensing means for slowing said driving means from a normal distributing speed to an angular position hunting speed.

12. Apparatus as defined in claim 4 which further includes
   a. a processing device for receiving thermoplastic material from said extendable-retractable means, and
   b. means responsive to an interruption in said distributing cycle for initiating operation of said processing device.

13. Apparatus as defined in claim 12 in which
   a. said processing unit includes a grinder unit and a blower unit,
   b. and in which said means for initiating operation of said processing device includes timing means for sequentially initiating operation of said grinder unit first and said blower unit second.

14. Apparatus as defined in claim 12 in which said extendable-retractable means includes
   a. conveyor means for conveying thermoplastic material from said distributing station to said processing device, and
   b. means responsive to the operation of said processing device for enabling operation of said conveyor means.

15. Apparatus as defined in claim 4 which further includes
   a. means for timing the operation of said extendable-retractable means in receiving and removing thermoplastic material from said distributing station, and
   b. means responsive to said timing means for interrupting operation of said thermoplastic supplying means after a predetermined period of time.

16. Apparatus for molding objects of thermoplastic material comprising
   a. a frame structure,
   b. a support rotatably mounted on said frame structure for rotation about an axis,
   c. means for rotatably driving said support,
   d. a plurality of molds disposed at spaced angular intervals on said support about said axis of rotation,
   e. means for supplying thermoplastic material to each of said molds at a distributing station above said axis of rotation,
   f. conveyor means having an inner portion extending transversely to said axis of rotation and supported in a cantilevered position adjacent said distributing station, and
   g. means for extending said inner portion of said conveyor means to said distributing station to receive and remove thermoplastic material from said supplying means when the rotation of said support means is stopped.

17. Apparatus as defined in claim 16 which further includes
   a. means for sensing a position of said molds which will not block the extending of said inner portion of said conveyor means to said distributing station, and
   b. means responsive to said mold position sensing means for enabling operation of said extending means.

18. Apparatus as defined in claim 16 which further includes
   a. means for sensing the extending of said inner portion of said conveyor means to said distributing station, and
   b. means responsive to said extending sensing means for disabling said support driving means.

19. Apparatus as defined in claim 16 which further includes
   a. means for sensing a retracted position of said conveyor means which will permit rotation of said molds about said axis, and
   b. means responsive to said retracted position sensing means for enabling operation of said support driving means.

* * * * *